US006597278B1

(12) United States Patent
Ando

(10) Patent No.: US 6,597,278 B1
(45) Date of Patent: Jul. 22, 2003

(54) MOBILE COMMUNICATION HAVING LINK ID CODE CHECKING FUNCTION

(75) Inventor: Toshihide Ando, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/538,489

(22) Filed: Mar. 30, 2000

(30) Foreign Application Priority Data

Jun. 15, 1999 (JP) .......................................... 11-168391

(51) Int. Cl.[7] .......................... G05B 19/00; G06F 7/00; G08B 29/00; H04B 1/00; H04Q 5/22

(52) U.S. Cl. ..................................... 340/5.25; 340/10.2

(58) Field of Search .............................. 340/10.2, 10.4, 340/10.41, 10.42, 572.1, 928, 825.36, 825.37, 825.38, 825.39; 370/314, 326

(56) References Cited

U.S. PATENT DOCUMENTS

| | | | | |
|---|---|---|---|---|
| 5,675,494 A | | 10/1997 | Sakurai et al. | 364/464.27 |
| 5,774,795 A | * | 6/1998 | Ando | 455/106 |
| 5,821,877 A | * | 10/1998 | Fallah | 340/825.54 |
| 5,952,940 A | * | 9/1999 | Matsumoto | 340/905 |
| 5,962,833 A | * | 10/1999 | Hayashi | 235/384 |
| 5,963,149 A | * | 10/1999 | Nagura et al. | 340/933 |
| 6,081,718 A | * | 6/2000 | Ando et al. | 455/447 |
| 6,275,552 B1 | * | 8/2001 | Ando | 375/368 |
| 6,396,814 B1 | * | 5/2002 | Iwamura et al. | 370/256 |

FOREIGN PATENT DOCUMENTS

| | | |
|---|---|---|
| JP | 5-307697 | 11/1993 |

* cited by examiner

*Primary Examiner*—Michael Horabik
*Assistant Examiner*—Nam Nguyen
(74) *Attorney, Agent, or Firm*—Posz & Bethards, PLC

(57) ABSTRACT

In a communication system between mobile communication devices and an immobile communication device, a mobile device receives a FCMC signal from the immobile device upon entering a communication service area of the immobile device. The mobile device checks for a coincidence of its own link identification code with other link identification codes included in the FCMC signal and already being used for communication with other mobile devices in the same communication service area. If the coincidence is present, the mobile device changes the own link identification code so that the communication with the immobile device may be executed by using the changed link identification code. In the event that a plurality of mobile devices use the same link identification codes, the immobile device requests the mobile devices to change the same link identification code to different-ones among the mobile devices.

18 Claims, 9 Drawing Sheets

MOBILE COMMUNICATION HAVING LINK ID CODE CHECKING FUNCTION

CROSS REFERENCE TO RELATED APPLICATION

This application relates to and incorporates herein by reference Japanese Patent Application No. 11-168391 filed on Jun. 15, 1999.

BACKGROUND OF THE INVENTION

The-present invention relates to mobile communications and devices therefor, which transmits a self-identification code upon entering into a communication service area of an immobile communication device of a fixed station and executes link processing for communications with the immobile communication station, thereby executing communications with the self-identification code after establishing the link.

Inter-vehicle communication systems execute dedicated short-range communications (DSRC) for communications between a mobile communication device mounted on a mobile object such as a vehicle and an immobile communication device such as a roadside station fixed on the roadside. Those systems may be applied to electronic toll collection systems (ETC) which collect traffic fees at toll roads such as expressways.

In each of those systems, the mobile device transmits a link-identification code provided exclusively thereto when entering into the communication service area of the immobile device to establish a communication link with the immobile device. The mobile device then communicates with the immobile device within the slot of a communication frame allocated thereto, after the link is established. According to this communication, even under the condition that a plurality of mobile communication devices are in the communication service area, the communication processing can be executed separately within the allocated slots with the respective link-identification codes. Thus, one-to-multiple bi-directional communication can be effected.

In the above inter-vehicle communication system, the link-identification code (LID) used between the mobile device and the immobile device is set at random in 28 bits of 4 octets (32 bits) according to ARIB-STD (Association of Radio Industries and Businesses Standard). It is not likely that the same link-identification codes are transmitted from two mobile devices in normal communications, as long as a maximum of two vehicles are within the communication service area.

It is however a recent trend to expand the communication service area so that one immobile device communicates with a plurality of mobile devices at the same time. The DSRC method defines a “class 2” communication distance to be up to 30 meters. This 30-meter communication service area is considered to cover three traffic lanes. In this instance, it is estimated that a maximum of more than eight vehicles travel at the same time in the 30-meter communication service area.

It is herein assumed that one vehicle newly enters the 30-meter communication service area in addition to preceding eight vehicles having respective mobile communication devices, and transmits its link-identification codes. It is also assumed that the link-identifications codes LID#1 to LID#8 of the mobile devices of eight vehicles are different. The probability of coincidence of LID#9 of the mobile device of the ninth vehicle with LID#1 to LID#8 is calculated as follows.

First, the maximum possible number of LIDs is $2^{28}$, because each link-identification is comprised of 28 bits. The probability (P1) of no coincidence of LID#9 with LID#1 to LID#9 is calculated as follows, in consideration that already eight LIDs are used.

$$P1=(2^{28}-8)/2^{28} \quad (1)$$

It is further assumed that a new vehicle enters the 30-meter communication service area every one second. In this instance, the probability (P2) of no coincidence among LIDs for a day (24 hours) is calculated as follows using the above expression (1).

$$P2=P1^{(24\times60\times60)}=0.9974 \quad (2)$$

As a result, the probability of coincidence among LIDs for a day is about 0.26%.

It is a general practice to install the immobile devices at a plurality of locations along the road. For instance, the immobile device is provided at each of a hundred toll gates of an expressway. In this instance, the probability (P3) of no coincidence among the LIDs for a day throughout the expressway is calculated as follows.

$$P3=P2^{100}=0.773 \quad (3)$$

As a result, the probability of coincidence for a day throughout the express way is about 22.7%.

If the above coincidence of LIDs occurs, the immobile device is disabled to distinguish mobile devices which have the same LID within the communication service area. This may be countered by transmitting from the immobile device to the mobile devices having the same LID a command to replace the same LID with new LIDS. However, the mobile device which has been communicating normally will be disabled to continue the existing communication.

SUMMARY OF THE INVENTION

It is therefore an object of the present invention to provide an inter-vehicle communication system and method which avoids a coincidence of link-identification codes of two mobile communication devices in the same communication service area.

According to the present invention, a mobile communication device uses its own link identification code generated at random for executing a communication with an immobile communication device in a communication service area of the immobile device. When the own link identification code coincides with another link identification code which is already being used for a communication with another mobile device within the same communication service area. The mobile device responsively changes the link identification code so that a changed link identification code is used for the communication with the immobile device.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

The present invention will be described in further detail with-reference to various embodiments.

(First Embodiment)

Figure 1:
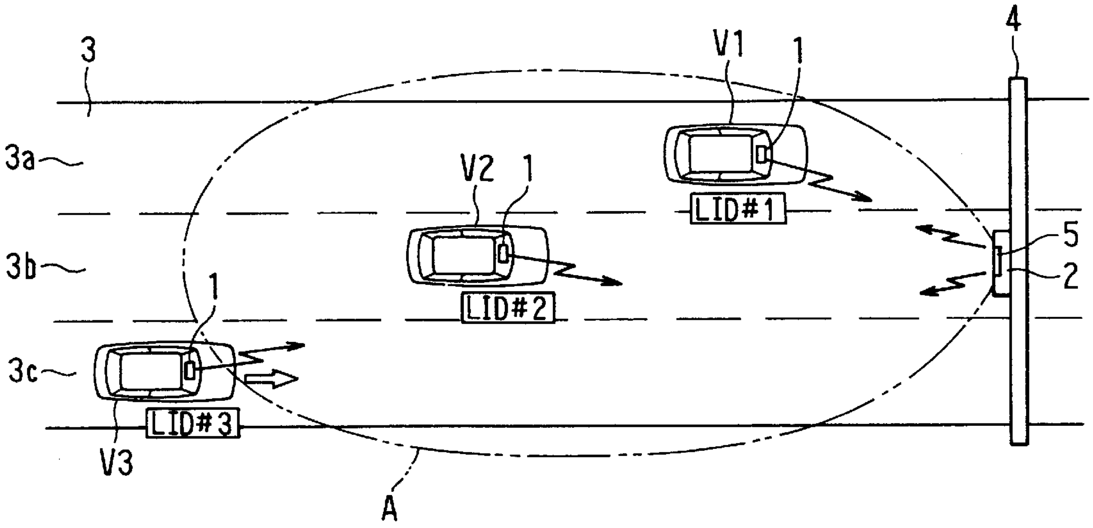
FIG. 1 is a schematic diagram showing a mobile communication system according to a first embodiment of the present invention.

Referring first to FIG. 1, vehicles V1 to V3 on an expressway 3 are illustrated as having communication devices (mobile devices) 1, respectively. The mobile devices 1 has respective link-identification code (LID#1, LID#2 and LID#3). The expressway 3 has three lanes 3*a*, 3*b* and 3*c*, and a gantry 4 is provided above the lanes 3*a* to 3*c*. The gantry 4 has a fixed communication station (immobile device) 2 which includes an antenna 5. The antenna 5 defines a communication service area A which covers about 30 meters over the lanes 3*a* to 3*c*.

Figure 2:
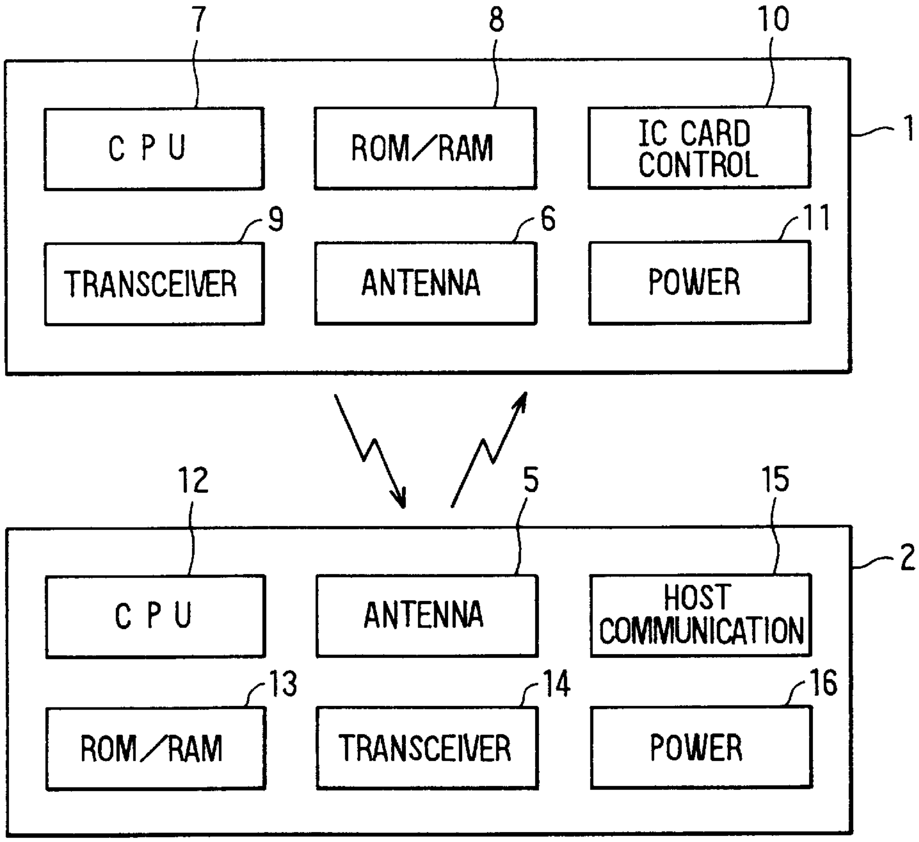
FIG. 2 is a block diagram of a mobile communication device and an immobile communication device used in the first embodiment.

The immobile device 2 is constructed to execute communication with the mobile device 1 through the antenna 5, when the vehicle enters the communication service area A. The immobile device 2 is provided near a toll gate to be used as a part of electronic toll collection system (not shown). For this purpose, an IC card may be used in the mobile device 1 to identify a vehicle (LID#1 to LID#3) to which the toll is charged. The mobile device 1 and the immobile device 2 are constructed as shown in FIG. 2.

The mobile device 1 has a micro strip-type antenna 6, CPU 7, memory (ROM/RAM) 8, transceiver circuit 9, IC card control circuit 10 and a power circuit 11. The CPU 7 is for executing communication processing and data processing based on programs stored in the ROM. The transceiver circuit 9 is for modulating and demodulating communication signals transmitted to and received from the immobile device 2 through the antenna 6, respectively. The IC card control circuit 10 is for reading and writing information into and from the IC card, respectively.

The immobile device 2 has the antenna 5, CPU 12, memory (ROM/RAM) 13, transceiver circuit 14, host communication circuit 15 and power circuit 16. The CPU 12 is for executing communication processing and data processing based on programs stored in the ROM. The transceiver circuit 14 is for modulating and demodulating communication signals transmitted to and received from the mobile device 1 through the antenna 5, respectively. The host communication circuit 15 is for executing communication with a host computer (not shown) which centrally processes data sent from the immobile device of each gantry.

The mobile device 1 and the immobile device 2 are programmed to operate as follows.

(1) Communication Method

Communications between the mobile device 1 and the immobile device 2 are controlled based on the DSRC method which is regulated under ARIB-STD (Association of Radio Industries and Businesses Standard). This communication method is based on "synchronized adaptive slotted aloha" communication protocol which is suitable for point-to-point short-time bi-directional communications. That is, this method is capable of full-dual communications in which different transmission channels (frequencies) are used-between an up-link and a down-link. This method is also capable of semi-dual communications.

Figure 3:
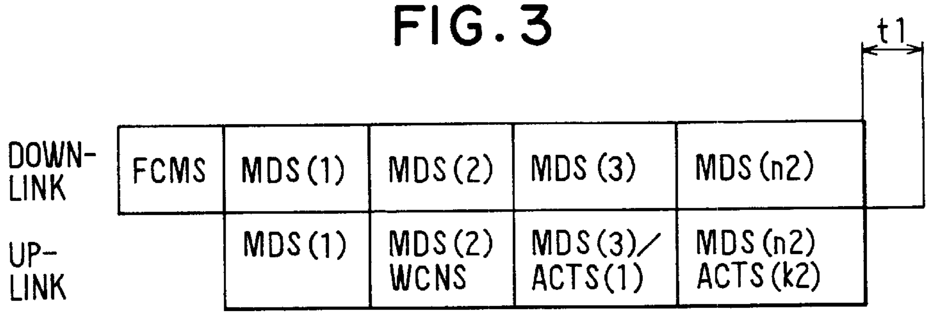
FIG. 3 is a diagram showing a frame format of a communication signal between the mobile device and the immobile device.

Communication frames are comprised of, as shown in FIG. 3, a frame control message slot (FCMS) for slot allocation, message data slots (MDS) for data forwarding, activation slots (ACTS) for link-connection with the communication link of the immobile device 2, and a wireless call number slot (WCNS) for transmission of wireless call code from the mobile device 1. The field length of each slot is uniformly set to 100 octets.

This frame construction is a variable-length frame type in which the number of MDS is n2 and the number of ACTS is k2. Some of MDS in the up-link channel are used also as ACTS. The attribute of each slot is determined by control information included in FCMS. This FCMS is always provided at the head of each frame and exclusive to the down-link only, so that information of slot allocation and frame control are transmitted from the immobile device 2.

Figure 4:
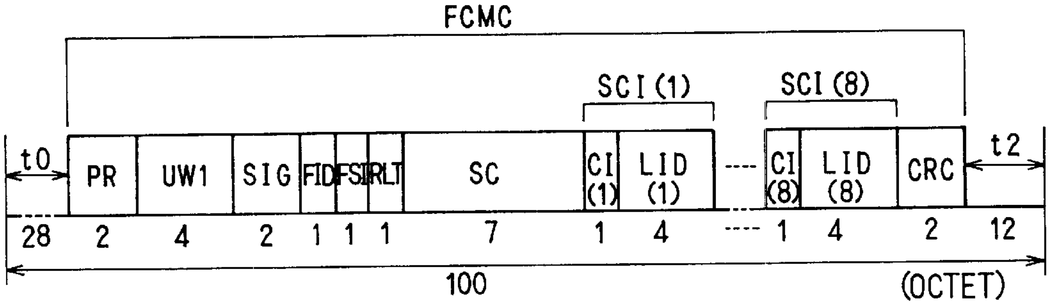
FIG. 4 is a diagram showing a format of a FCMC signal included in the communication signal shown in FIG. 3.

The FCMS is a communication control slot which is used for the immobile device 2 to transmit a frame control message channel (FCMC). The FCMC is formatted as shown in FIG. 4, and includes therein frame control information and slot allocation information of time division multiple access (TDMA). The slot allocation information is provided with a slot control identifier (SCI) as a slot control information field. This field is provided with control information sub-field control information (CI) of one octet, and a link address field identification (LID) of four octets.

Figure 5:
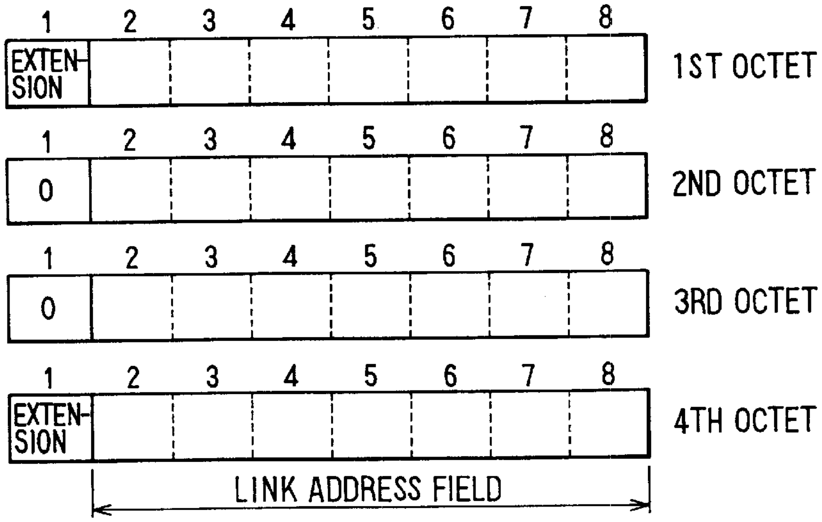
FIG. 5 is a diagram showing a format of a LID signal included in the FCMC signal shown in FIG. 4.

The LID is formatted as shown in FIG. 5, and has data of fixed length of four octets. This LID is used as a private link address for private communication between the mobile device 1 and the immobile device 2. In addition, it is used as link addresses for concurrent communications or group communications. When it is used as the private link address, the LID is set in 28 bits of each octet excluding the head bit. As a result, the number of LID which is probable is $2^{28}$.

With the above communication method, communications are executed as follows. When the vehicle having the mobile device 1 enters the communication service area A of the immobile device 2, the mobile device 1 checks for any coincidence of LID by executing code check processing. This processing is LID check processing (2) shown in FIG. 6 and described later. If no coincidence is found, it transmits an ACTS signal along with the LID.

The immobile device 2 recognizes in response to the ACTS signal that the mobile device 1 has entered its communication service area A. The immobile device 2 executes link processing. In this processing, the immobile device 2 checks whether the LID of the mobile device 1 which transmitted the ACTS signal coincides with that of another mobile device which is now in communication with the immobile device 2, and checks whether it received another ACTS signal with the same LID. If no coincidence of LID is present, the immobile device 2 transmits an FCMC signal the communication slot of which is designated by the LID. If coincidence is present, the immobile device 2 sets LID again, and executes the link processing again.

The mobile device 1 is thus enabled to communicate with the immobile device 2 within the frame by using the slots allocated by the LID. Thus, the link processing is established. The mobile device 1 then continues its communication processing in each frame by using the slots allocated by the FCMC signal, so that it receives and transmits data. This communication processing is terminated when all necessary communications are completed. It is to be noted that a coincidence is avoided by avoidance processing (4) described later, if coincidence of LID should occur in the course of the above communication processing.

(2) LID Check Processing

Figure 6:
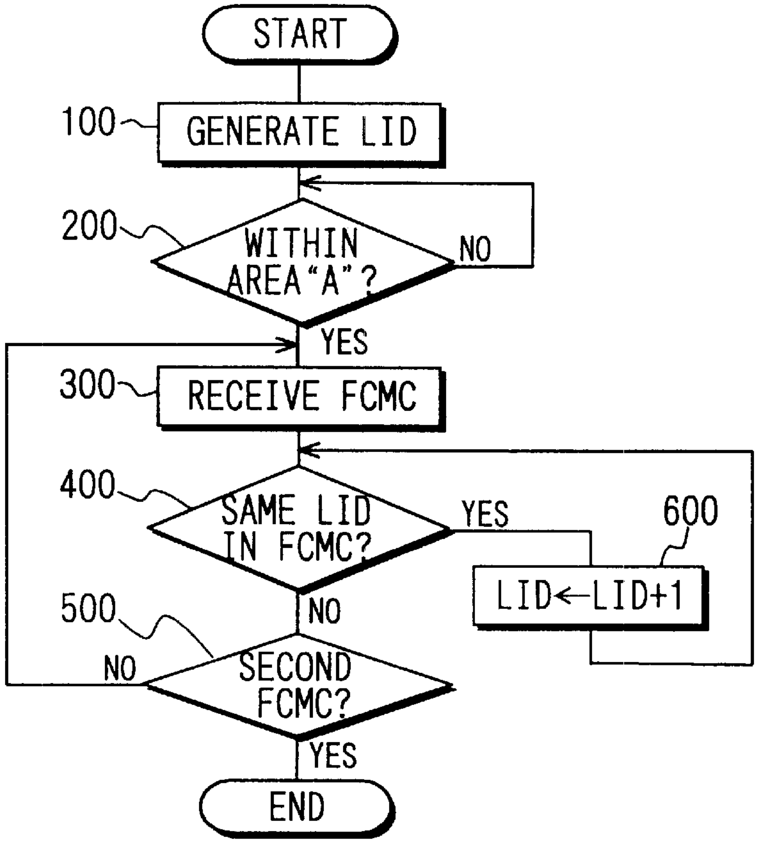
FIG. 6 is a flow diagram showing a LID code check processing executed by the mobile device.

The mobile device 1 first executes the LID check processing immediately after entering the communication service area A. This processing is for avoiding coincidence of LIDs and executed as shown in FIG. 6.

Figure 7:
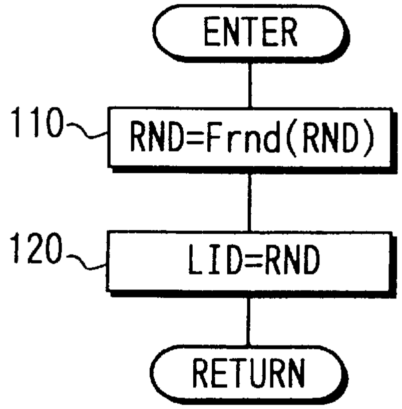
FIG. 7 is a flow diagram showing a LID generation processing executed by the mobile device.

The mobile device 1, particularly CPU 7, generates its own LID at step 100. This step 100 is executed to generate 28-bit LID from random numbers as shown in FIG. 7. That is, a random number RND is generated at step 110 by using a random number generation function Frnd(RND). Then, this random number RND is set as LID at step 120.

The mobile device 1 checks at step 200 (FIG. 6) whether it is within the communication service area A. This check may be effected in response to reception of signals transmitted from the immobile device 2. If the check result is YES, the mobile device 1 receives the FCMC signal of the immobile device 2 at step 300. The mobile device 1 refers to LIDs in the received FCMC signal. Those LIDs are the ones which are already being used by the immobile device 2 for communication with other mobile devices in the same communication service area A. The mobile device 1 checks at step 400 whether its own LID is the same as those of other LIDs currently being used.

If the check result at step 400 is NO indicating that there is no coincidence of LID in the received FCMC signal, the mobile device 1 checks at step 500 whether it received the FCMC signal again. If the check result at step 500 is NO, it receives the FCMC signal again at step 300 and checks for the coincidence at step 400. If the check result at step 500 is YES, the mobile device 1 completes the LID check processing. This processing corresponds to the case in which the LID#3 of the vehicle V3 newly entering the communication service area A is different from the LID#1 and LID#2 of the vehicles V1 and V2 already traveling in the same area A.

If the check result at step 400 is YES indicating coincidence of LID, the mobile device 1 increments its own LID by one (LID=LID+1) at step 600 and repeats steps 300, 400 and 500 until it confirms that no coincidence is present.

Figure 8:
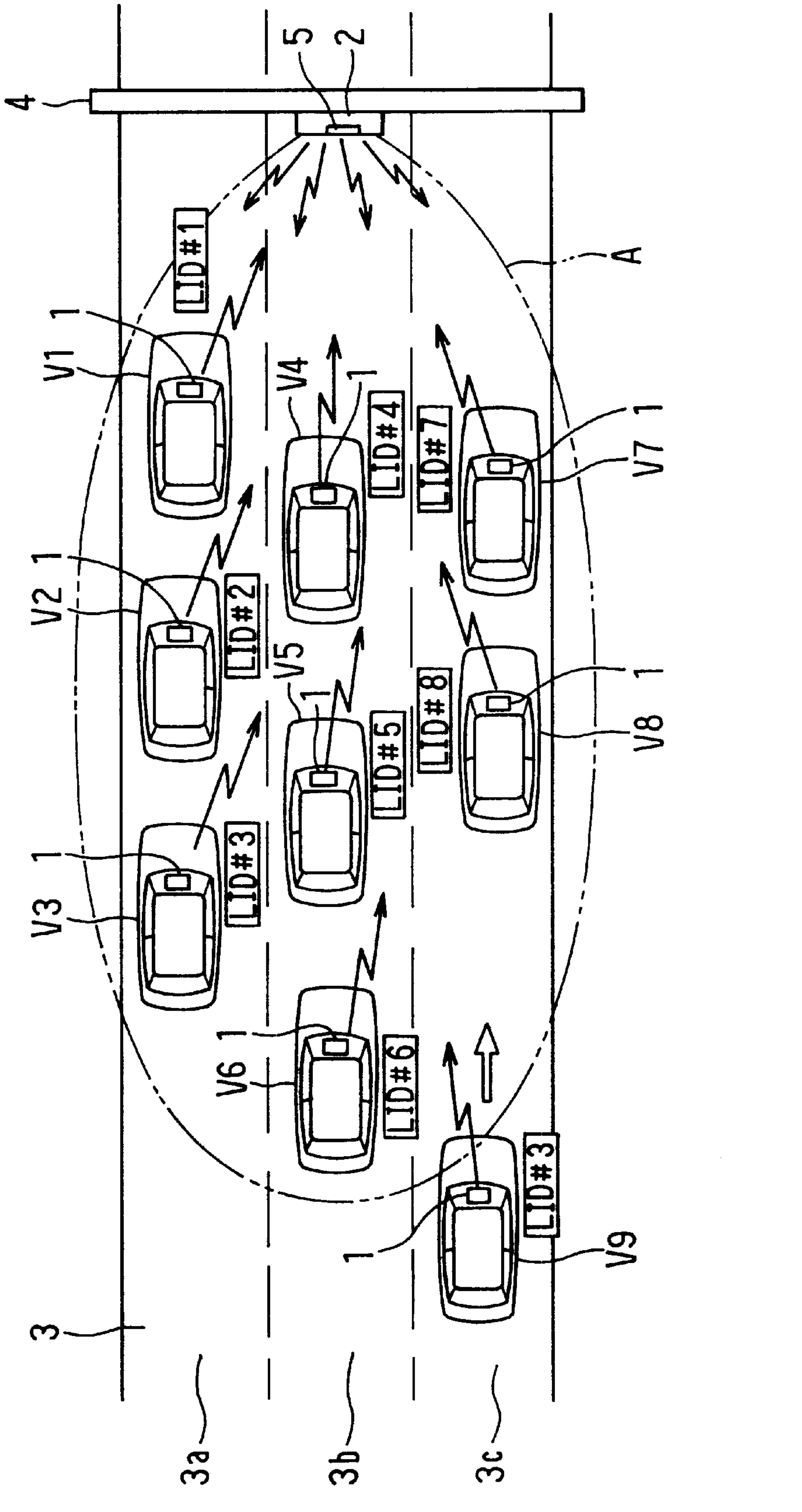
FIG. 8 is a schematic diagram showing one mode of operation of the first embodiment.

Here, it is assumed that a vehicle V9 newly enters the communication service area A in which a plurality of (for instance, eight) vehicles V1 to V8 are already in communication with the immobile device 2 as shown in FIG. 8. It may occur that the LID of the vehicle V9 is the same as one (for instance, LID#3) of the LIDs of the vehicles V1 to V8. In this instance, the mobile device 1 of the vehicle V9 changes its own LID from LID#3 to LID#9 by repeating the processing of FIG. 6, particularly step 600. The LID may alternatively be changed based on the processing of FIG. 7. The probability of coincidence of the changed LID are the same between step 600 (FIG. 6) and steps 110 (FIG. 7). The processing of FIG. 6 is preferable, because it takes less time to change LID. It is to be noted that, at step 600, a predetermined number larger than 1 may be added. Further, the LID may be changed by subtraction, multiplication or division.

(3) Link Processing

Figure 9:
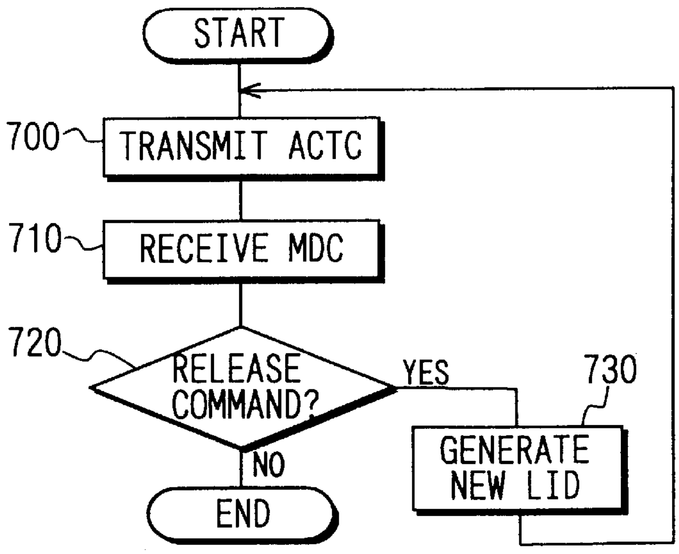
FIG. 9 is a flow diagram showing a link processing executed by the mobile device.
Figure 10:
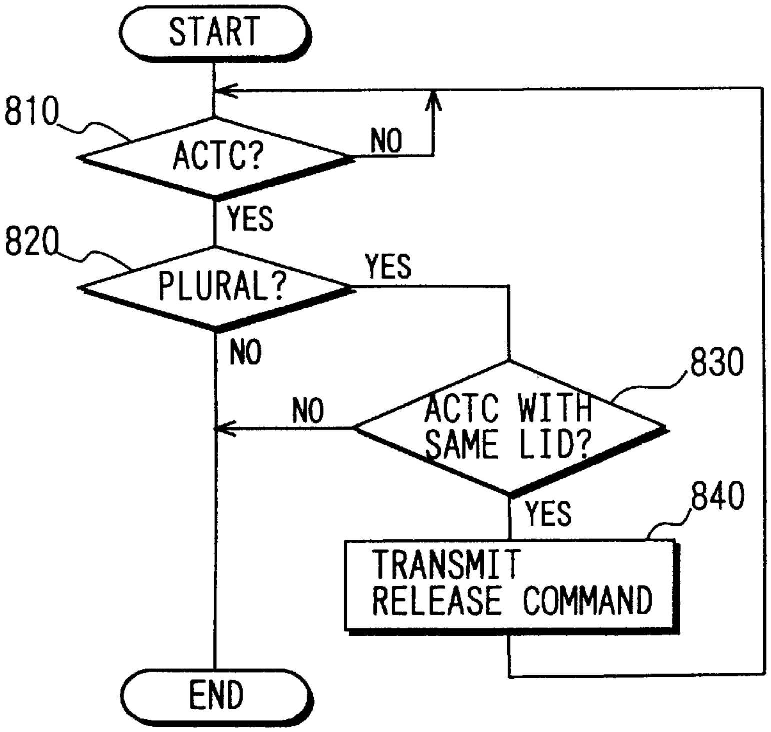
FIG. 10 is a flow diagram showing a link processing executed by the immobile device.

The mobile device 1 executes the link processing shown in FIG. 9 and the immobile device 2 executes the link processing shown in FIG. 10, after determining no coincidence of LIDs in the processing of FIG. 6.

Figure 12:
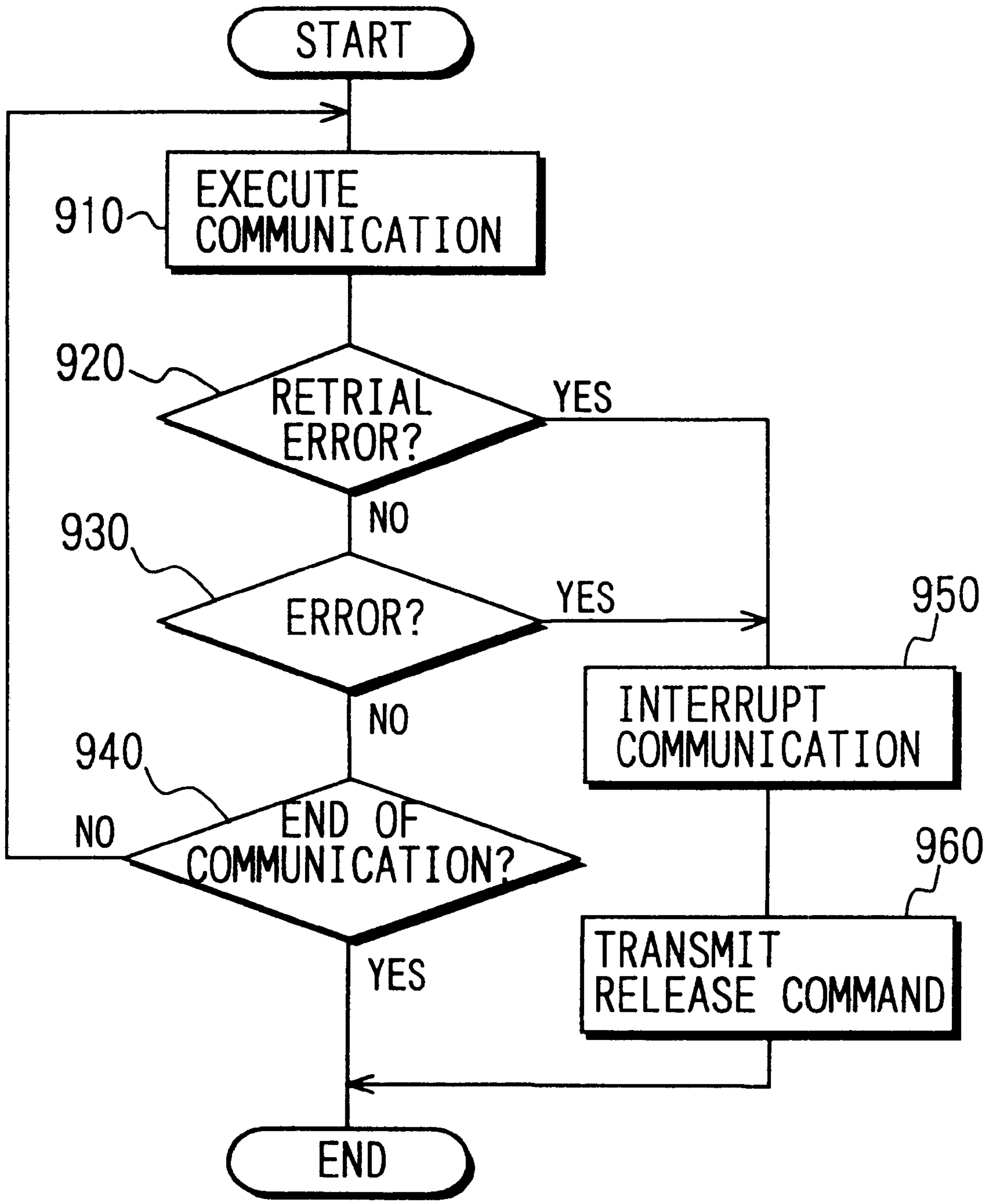
FIG. 12 is a flow diagram showing a communication processing executed by the immobile device.

The mobile device 1 first transmits an activation channel (ACTC) signal at step 700. The immobile device 2 receives it and checks at step 810 whether it is the ACTC signal. The immobile device 2 then checks at step 820 whether a plurality of ACTC signals were received. If the check result at step 820 is NO indicating that only one ACTC signal was received, the immobile device 2 accepts it and ends its link processing and then executes a communication processing (4) described later with reference to FIG. 12.

The mobile device 1 receives a message data channel (MDC) signal from the immobile device 2 at step 710, and checks at step 720 whether it is a release command. If the check result at step 720 is NO, the mobile device 1 ends the link processing and executes its communication processing.

Figure 11:
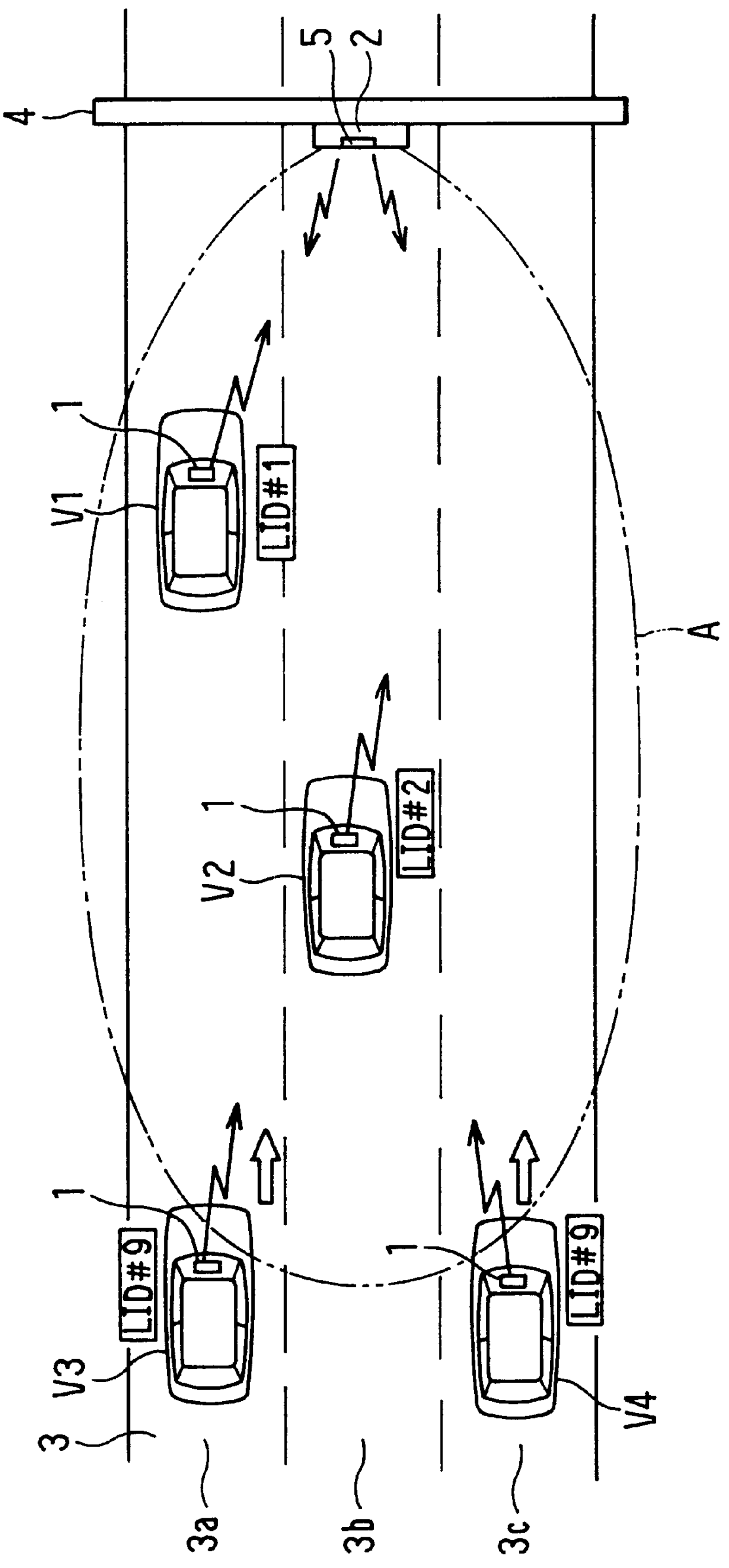
FIG. 11 is a schematic diagram showing another mode of operation of the first embodiment.

It may occur that the LIDs transmitted from the mobile devices 1 of vehicles simultaneously entering the communication service area A happen to coincide with each other. This may happen as shown in FIG. 11. That is, vehicles V3 and V4 which enters the same service area A at the same time under the condition 1if that the vehicles V1 and V2 are already in communication with the immobile device 2. The mobile devices 1 of the vehicles V3 and V4 have the same LID#9, while the mobile devices 1 of the vehicles V1 and V2 have LID#1 and LID#2 different from each other and from LID#9. In this instance, no coincidence will be detected in each of the above LID check processing (FIG. 6) of the mobile devices 1 of the vehicles V3 and V4. As a result, the mobile devices 1 of the vehicles V3 and V4 will tend to start the above link processing (FIG. 9).

However, when the same LID#9 are transmitted from the vehicles V3 and V4, the immobile device 2 receives a plurality of (two) ACTC signals. The immobile device 2 determines YES at step 820, and checks at step 830 whether the Lids included in the received ACTC signals are the same (LID#9). If the check result at step 830 is NO, the immobile device 2 accepts the LID#9 and ends this link processing.

If the check result at step 830 is YES indicating reception of the same Lid#9, the immobile device 2 transmits a release command (identification code change command) to the vehicles V3 and V4 at step 840 requiring the mobile devices 1 of the vehicles V3 and V4 to change the LID#9. The immobile device 2 waits for next ACTC signals to repeat the above link processing from step 810 until it is confirmed that no coincidence occurs.

The mobile device 1 checks at step 720 whether the MDC signal received from the immobile device 2 at step 710 is the release command. The mobile device 1 determines YES in the above case of FIG. 11. The mobile devices 1 in the vehicles V3 and V4 generate new LIDs at step 730 and transmit it with the ACTC signal at step 700, respectively. If the MDC signal received from the immobile device 2 includes no release command, the mobile device 1 confirms that its new LID is differentiated successfully and ends the link processing.

The mobile device 1 generates the new LID at step 730 using the random number generation function as shown in steps 110 and 120 (FIG. 7). This is because the mobile devices 1 of the vehicles V3 and V4 will surely generate the same LIDs, if it is generated in the same manner as step 600 (FIG. 6). Although the mobile device 1 executes step 700 after step 730 immediately in the processing of FIG. 9, it is of course possible to execute step 700 after checking for any coincidence of the new LID with other LIDs being already used in the communications in the same service area A.

(4) Communication Processing

It may also occur in the case of FIG. 11 that the mobile devices 1 of the vehicles V3 and V4 transmits the ACTC signals with the same LIDs at the same time, but the immobile device 2 receives only one ACTC signal. That is, the immobile device 2 recognizes only one (for instance, only vehicle V3), and establish the link to execute communication processing with only vehicle V3. The immobile device 2 counters this problem by executing the communication processing shown in FIG. 12.

This processing is based on the fact that there occurs some illogical events in communications when the immobile device 2 communicates with a plurality of mobile devices having the same Lids. That is, it rarely occurs that the same code is transmitted at the same time in the course of attestation processing in normal communications, even when the LIDs are the same. Therefore, it becomes illogical to continue communications while handling plural mobile devices 1 as one mobile device at some point in the communication.

Further, this processing is shown with respect to only one LID for brevity, although the processing is more complicated in reality because the immobile device 2 communicates with a plurality of mobile devices.

Specifically, the immobile device 2 starts to execute communication at step 910, and checks at step 920 whether any retrial error occurred. The retrial error occurs when no response is received in response to its signal transmission. The immobile device 2 further checks at step 930 whether any error occurred in codes or in attestation. If the check results at steps 920 and 930 are NO indicating no errors, the immobile device 2 checks at step 940 whether the communication is at an end. The above steps 910 to 940 are repeated if the check result at step is NO, while this communication processing ends to start the link processing again for the next communication if the check result is YES.

If the check result at step 920 or 930 is YES indicating occurrence of error, the immobile device 2 interrupts its communication and cancels the contents of past communication at step 950. The immobile device 2 then transmits the release command (identification code change command) at step 960. Thus, the mobile devices of the vehicles V3 and V4 returns to the LID code check processing shown in FIG. 6 to set new LIDs.

According to the above embodiment, before starting the link processing (FIG. 9) by the mobile device 1, it is checked whether the LID of the mobile device 1 coincides with the LIDs used by the other mobile devices in the same communication. The LID is changed to avoid coincidence, if coincidence occurs. The immobile device 2 is thus enabled to start the link processing (FIG. 10) without any coincidence among Lids. Communications being already executed with the mobile devices 1 will not be interrupted.

Further, the immobile device 2 transmits the release command in response to coincidence among LIDs, and the mobile device 1 change its LID in response to the release command. Thus, even when a plurality of mobile devices 1 enter the same service area A at the same time and uses the same LIDs, those LIDs are changed to be different from each other to execute the link processing again.

Even when the LIDs of mobile devices 1 entering the service area A at the same time and having the same LIDs cannot be changed successfully for some reason by the above processing, the immobile device 2 finds the retrial error or attestation/code error during the communication processing. The immobile device 2 then invalidates such LIDs and causes the mobile devices 1 to change respective LIDs, so that the link processing may be executed again. Thus, communications can be effected while avoiding any problems which would otherwise caused by the coincidence among LIDs.

Owing to the above operations and advantages, the communication service area of each immobile device can be expanded and the number of immobile devices can be increased, although such expansion and increase will increase the probability of coincidence among LIDs.

(Second Embodiment)

Figure 13:
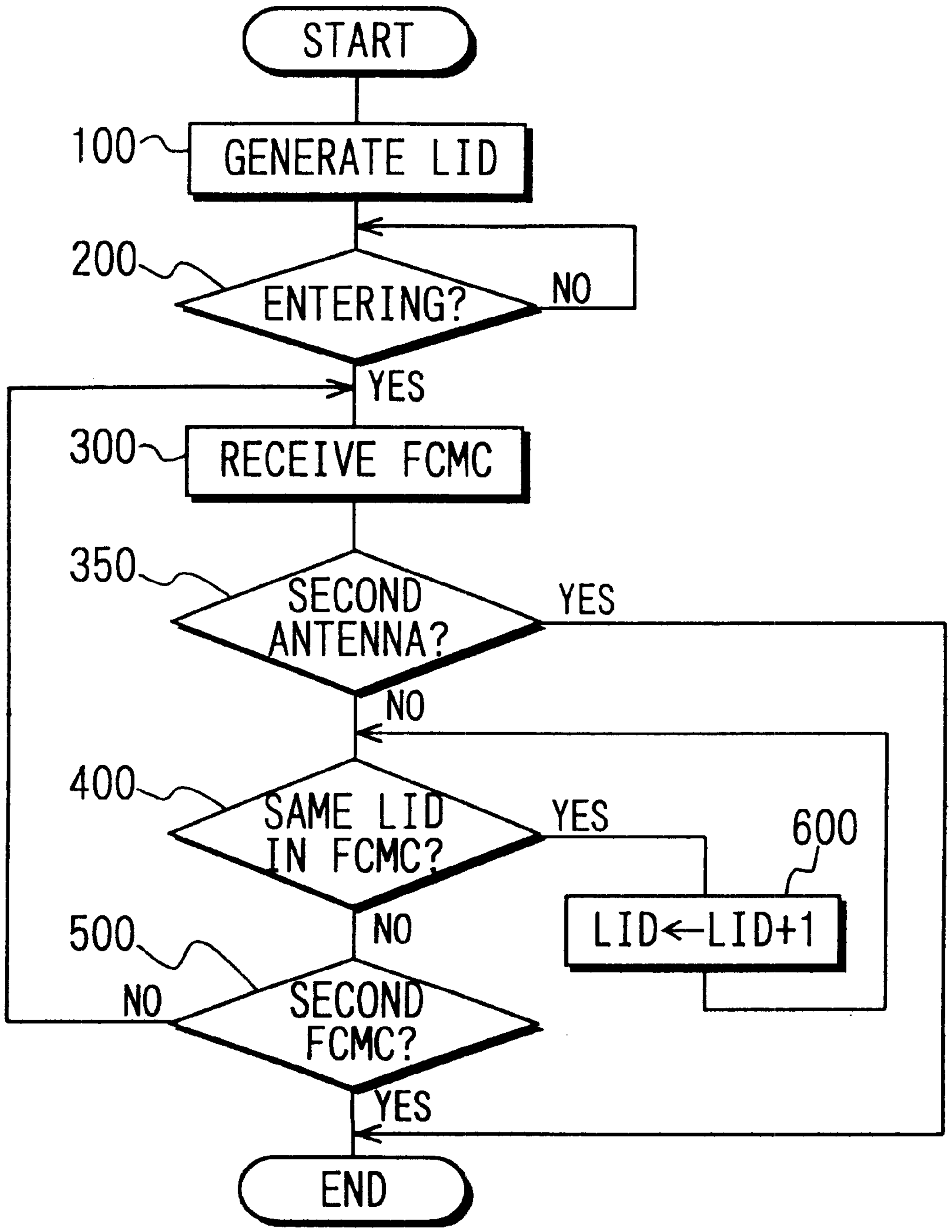
FIG. 13 is a flow diagram showing a LID code check processing executed by the mobile device in a second embodiment of the present invention.
Figure 14:
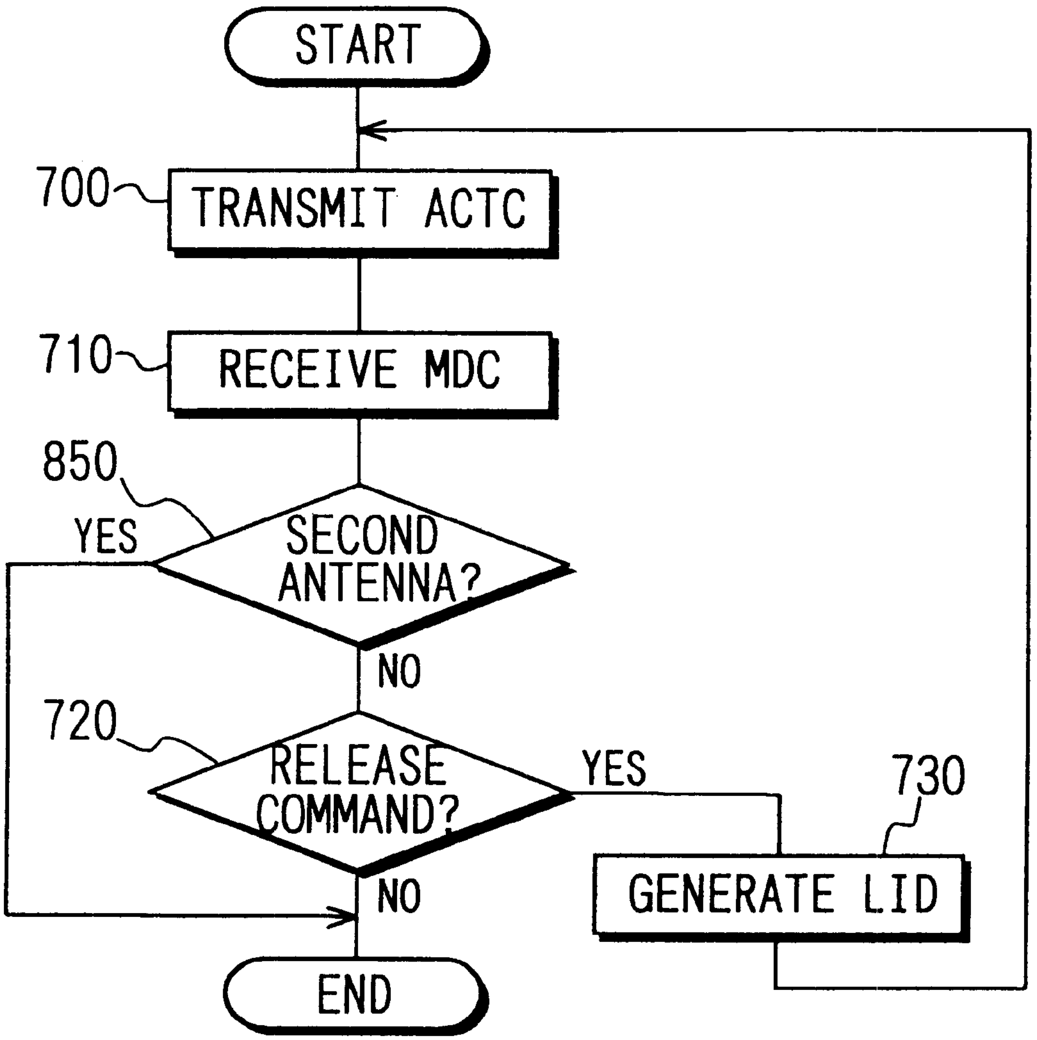
FIG. 14 is a flow diagram showing a link processing executed by the mobile device in the second embodiment.

A second embodiment shown in FIGS. 13 and 14 is directed to a case in which a plurality of (two) communication service areas A1 and A2 are inter-related. The service areas A1 and A2 are defined by two antennas of the immobile device 2. It is assumed that the communication is executed by using same LID in both communication service areas A1 and A2.

In this embodiment, it is first checked whether the LID of a vehicle entering the first service area A1 is different from the LIDs of other vehicles already in communication. If different, it can be recognized from a signal included in the received FCMC signal and indicating the ID of the second antenna that the same LID should be used when the vehicle enters the second service area A2 immediately after the first service area A1.

Specifically, the mobile device 1 executes the LID code check processing shown in FIG. 13. That is, after receiving the FCMC signal at step 300, the mobile device 1 checks at step 350 whether the antenna ID in the FCMC signal indicates the second antenna (second service area A2) inter-related with the first antenna (first service area) A1. If the check result is YES, the mobile device 1 ends the following LID check processing (steps 400 to 600) and executes the link processing shown in FIG. 14.

In the link processing of FIG. 14, after receiving the MDC signal at step 710, the mobile device 1 checks at step 850 whether the antenna ID in the received MDC signal indicates the second antenna (second service area A2). If the check result is YES, the mobile device 1 ends the following link processing (steps 720 and 730). Thus, even when the release command is transmitted from the immobile device 2 for some reason, the mobile device 1 does not change its LID so that it may start communications with the immobile device 2 by using the same LID.

According to the second embodiment, the LID check processing is interrupted or LID change in the link processing is disabled to execute the communication processing, when the mobile device 1 is in the inter-related communication areas in which the communication should be executed while maintaining the same LID.

The present invention should not be limited to the above embodiments, but may be modified or applied in a different manner. For instance, it may be applied to collect charges at parking lots or other facilities as well as at toll roads. Further, it may be applied to mobile communications of traffic information, internet communications, electronic mail processing as well as toll or charge collection.

What is claimed is:

1. A mobile communication device for communication with an immobile communication device which is fixed to have a communication service area, the mobile device comprising:

communication control means for transmitting its own link identification code upon entering the communication service area of the immobile device, executing a link processing for communication with the immobile device, and executing a communication processing using the link identification code after a link with the immobile device is established;

identification code check means for, prior to executing the link processing, receiving another link identification code which is already being used by the immobile device for communication with another mobile device in the communication service area, and checking a coincidence of the own link identification code with the another identification code; and identification code change means for changing the own link identification code in response to a check result indicating the coincidence of the link identification code.

2. A mobile communication device of claim 1, wherein:

the identification code check means is further for checking a coincidence of the changed own link identification code; and the identification code change means is further for changing the changed own link identification code in response to a check result indicating the coincidence of the changed own link identification code.

3. A mobile communication device of claim 1, wherein:

the identification code check means is for repeating its checking operation at least twice.

4. A mobile communication device of claim 1, wherein:

the identification code change means is for changing the own link identification code by adding a predetermined value to the own link identification code.

5. A mobile communication device of claim 1, wherein:

the identification code change means is for changing the own link identification code by using a random number.

6. A mobile communication device of claim 1, wherein:

the communication control means is for causing the identification code change means to change the own link identification code, when a code change command is received from the immobile device during an execution of the link processing.

7. A mobile communication device of claim 1, wherein:

the communication control means is for, when a code change command is received from the immobile device during an execution of the communication processing, interrupting an execution of the communication processing, for causing the identification code change means to change the own link identification code, and for controlling the identification code check means to check a coincidence of the changed link identification code.

8. A mobile communication device of claim 6, wherein:

the identification code change means is for changing the own link identification code based on a random number in a code change operation when the code change command is received.

9. A mobile communication device of claim 7, wherein:

the identification code change means is for changing the own link identification code based on a random number in a code change operation when the code change command is received.

10. A mobile communication device of claim 1, wherein:

the identification code check means is for interrupting its check operation and executing the link processing, when a present communication service area is determined as being inter-related with a previous communication service area in its check operation.

11. A mobile communication device of claim 1 further comprising:

identification code generation means for generating the own link identification code.

12. A mobile communication device of claim 11, wherein:

the identification code generation means is for generating the own link identification code based on a random number.

13. A mobile communication device of claim 11, wherein:

the identification code generation means is for generating a new link identification code before a next check operation is initiated, when the communication processing ends.

14. A mobile communication device of claim 12, wherein:

the identification code generation means is for generating a new link identification code before a next check operation is initiated, when the communication processing ends.

15. An immobile communication device for communication with mobile communication devices, the device comprising:

communication control means for receiving link identification codes transmitted from the mobile devices upon entering a fixed communication service area, executing a link processing for executing communications with the mobile devices, and executing a communication processing by using the link identification codes when links are established; and link control means for checking for a coincidence among the link identification codes received in the link processing, for invalidating the link identification codes which coincide each other, and for transmitting an identification code change command to the mobile devices which transmitted the coinciding link identification codes.

16. An immobile communication device of claim 15, wherein:

the communication control means is for, when the coincidence is found by the link control means in the communication processing, interrupting the communication processing, invalidating the coinciding link identification codes, and transmitting an identification code change command to the mobile devices transmitted the coinciding identification codes.

17. A communication method between a mobile communication device and an immobile communication device comprising:

transmitting from the mobile device to the immobile device a signal including a link identification code generated at random upon entering a communication service area of the immobile device;

transmitting from the immobile device to the mobile device a signal requesting a change of the transmitted link identification code, when the immobile device determines that the transmitted link identification code coincides with another link identification code which is already being used for a communication with another mobile device within the communication service area; and changing the link identification code at the mobile device in response to the signal of code change request so that a changed link identification code is transmitted again to the immobile device to establish a link with the immobile device.

18. A communication method of claim 17, further comprising:

checking for, at the immobile device, a coincidence among a plurality of link identification codes newly transmitted from a plurality of mobile devices; and invalidating the plurality of link coinciding link identification codes and transmitting the signal of code change request to the mobile devices which transmitted the coinciding link identification codes.

* * * * *